United States Patent [19]

Kuo

[11] Patent Number: 5,231,278
[45] Date of Patent: Jul. 27, 1993

[54] BAR CODE WAND READER ADAPTER

[75] Inventor: Ming-Tai D. Kuo, Marblehead, Mass.

[73] Assignee: Raytheon Company, Lexington, Mass.

[21] Appl. No.: 705,245

[22] Filed: May 24, 1991

[51] Int. Cl.$^5$ .............................................. G06K 7/10
[52] U.S. Cl. .................................... 235/472; 235/483
[58] Field of Search ............... 235/472, 483, 485, 486; 250/227.13

[56] References Cited

U.S. PATENT DOCUMENTS

| | | | |
|---|---|---|---|
| 3,238,501 | 3/1966 | Mak et al. | 235/472 X |
| 4,210,802 | 7/1980 | Sakai | 235/483 |
| 4,496,831 | 1/1985 | Swartz et al. | 235/472 |
| 4,642,459 | 2/1987 | Caswell et al. | 235/472 X |

FOREIGN PATENT DOCUMENTS

| | | | |
|---|---|---|---|
| 2-304685 | 12/1990 | Japan | 235/472 |
| 1419622 | 12/1975 | United Kingdom | 235/487 |

OTHER PUBLICATIONS

Montedonico, R. W., "Self Adjusting Swivel Tip For Light Pen", IBM Technical Disclosure Bulletin, vol. 11, No. 12, May, 1969, p. 1761.

Minor and Sedaris, "Light Shield For Optical Wand", IBM Technical Disclosure Bulletin, vol. 20, No. 10, p. 4043, Mar. 1978.

*Primary Examiner*—John Shepperd
*Assistant Examiner*—Edward H. Sikorski
*Attorney, Agent, or Firm*—Donald F. Mofford; Richard M. Sharkansky

[57] ABSTRACT

A bar code wand reader adapted to read a bar code disposed on a narrow surface such as an edge of a printed wiring board is shown to include a bar code wand reader adapter (32) affixed to an end of a bar code wand reader (34). The adapter includes a fore surface having a slot (30) provided therein. The slot is adapted to hold the bar code wand reader at a constant distance and position from the edge of the narrow surface having the bar code disposed thereon. With such an arrangement, the bar code reader is held at a proper disposition as the bar code wand reader is passed over the bar code disposed on the narrow surface. The latter provides a proper reading with a single passing and prevents the necessity of numerous attempts at reading the bar code.

5 Claims, 4 Drawing Sheets

BAR CODE WAND READER ADAPTER

BACKGROUND OF THE INVENTION

This invention pertains generally to bar code readers and more particularly a bar code wand reader adapted to read a bar code disposed on a narrow edge of a printed wiring board.

As it is known in the art, optical scanners when connected to a computer system can be used to input data into the computer system. One type of optical scanner used to input data includes a pen-shaped wand which optically scans specially printed bar coded labels attached t selected goods over which it is passed. For example, optical scanners are used today at most checkout counters in major department stores. A bar code which provides some method of binary coding the data is used so that the bar code will represent the necessary numerical and alphanumeric characters needed to identify the product. A label with the appropriate bar code is affixed to each product. The pen-shaped wand, hand-held by a checking clerk, is passed over the bar code which identifies the product and a signal is fed to a computer which is connected to a cash register to enter an appropriate sale. Such an arrangement speeds up the check out process and minimizes errors made by the checking clerk.

It should be appreciated, a bar code label could be used to identify other types of products. For example, using a bar code on an edge of a printed wiring board would be a viable option to mark the board, especially as board population increases and the availability of space on the face of the board decreases.

SUMMARY OF THE INVENTION

With the foregoing background of this invention in mind, it is a primary object of this invention to provide a bar code wand reader adapted to read bar code disposed on a narrow surface.

Another object of this invention is to provide a bar code wand reader adapted to read a bar code disposed on an edge of a printed wiring board.

Still another object of this invention is to provide a bar code wand reader adapted to read a bar code disposed on a curved surface.

The foregoing and other objects of this invention are met generally by a bar code wand reader adapter affixed to an end of a bar code wand reader, the adapter includes a fore surface having a slot provided therein. The slot is adapted to hold the bar code wand reader at a constant distance and position from the edge of a narrow surface having a bar code disposed thereon. With such an arrangement, the bar code reader is held at a proper disposition as the bar code wand reader is passed over the bar code disposed on the narrow surface. The latter provides a proper reading with a single passing and prevents the necessity of numerous attempts at reading the bar code.

BRIEF DESCRIPTION OF THE DRAWINGS

For a more complete understanding of the invention reference is now made to the following description of the accompanying drawings, wherein.

DESCRIPTION OF THE PREFERRED EMBODIMENTS

Figure 1:
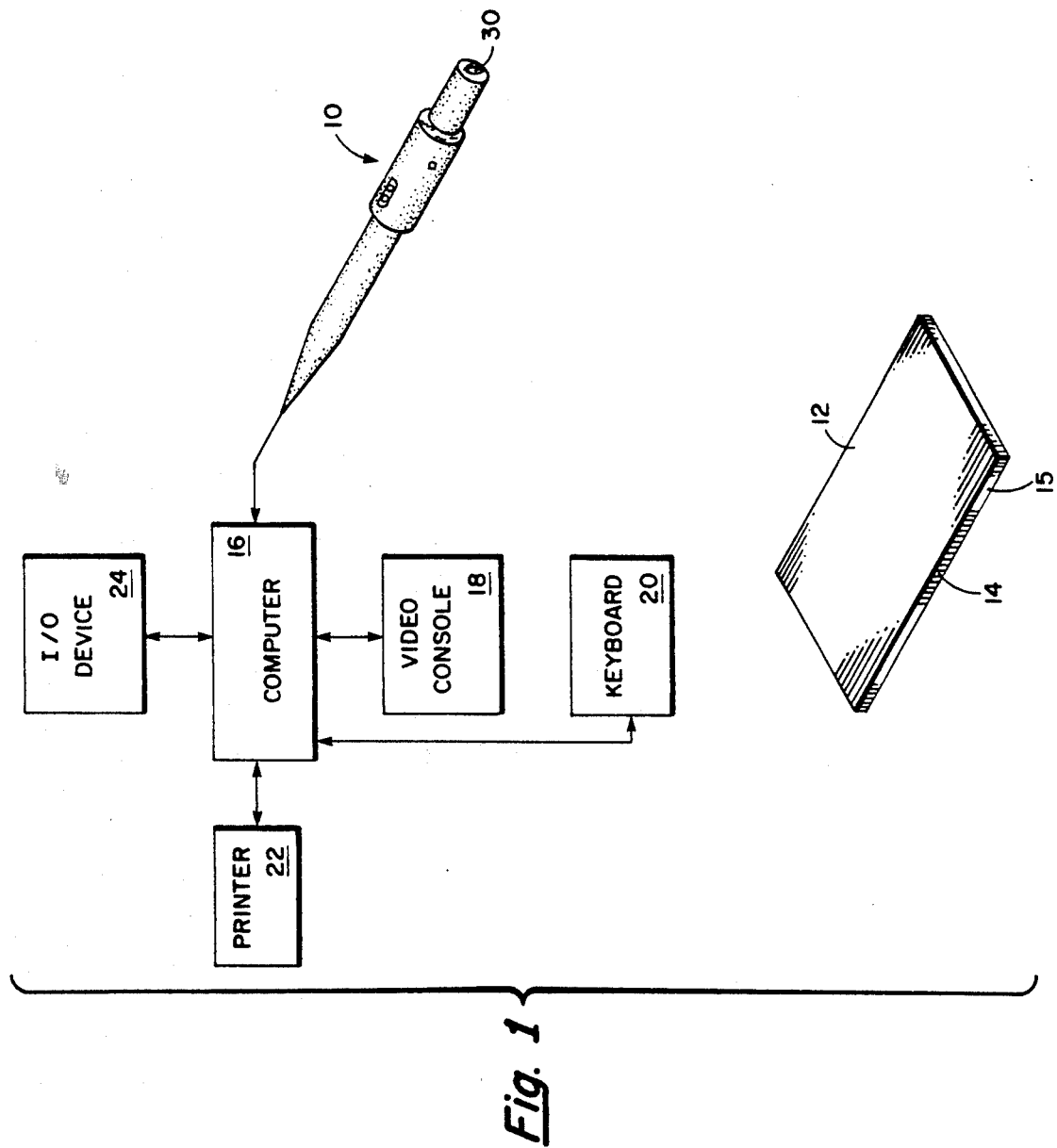
FIG. 1 is a diagram showing a bar code reader according to the invention connected to a computer system which stores data from the bar code reader as obtained from a bar code disposed on an edge of a printed wiring board.

Referring now to FIG. 1, a printed wiring board 12 is shown to have disposed thereon indicia 14 (hereinafter also referred to as bar code 14) disposed on a narrow surface 15 of the printed wiring board 12. It is often desirable to populate the printed wiring board 12 to a maximum extent possible, thus preventing space from being available to etch identifying information on a face of the printed wiring board 12. Using indicia 14 arranged to provide a bar code with identifying features on the narrow surface 15 of the printed wiring board 12 provides an alternate method of identifying the printed wiring board 12. Using known bar code readers to read the bar code 14 provides a dilemma. With the bar code 14 being so small, when known bar code readers are passed over the bar code 14, improper readings often result requiring multiple passings before achieving a proper reading. Multiple passings take more time and decreases the amount of correct readings performed in a given time.

A bar code wand reader 10 according to the invention is shown connected to a computer 16. Also connected to the computer 16 is a video console 18, a keyboard 20, a printer 22 and an I/0 Device 24. The I/0 Device 24 could be a work station or any other device interfaced to the computer 16 which needs to manipulate data provided by the bar code wand reader 10. One who is skilled in the art of data manipulation should be familiar with the workings of the computer 16, the video console 18, the keyboard 20, the printer 22 and the I/O device 24 such that further description should not be necessary. The bar code wand reader 10 with a groove 30 is used to read the bar code 14 disposed on the narrow edge 15 of the printed wiring board 12 by passing the groove 30 across the bar code 14 which is coded to properly identify the printed wiring board 12. Typically, a bar code complying to standards require that its height be at least 15% of its length or 0.25 inches, which ever is greater. This specification guaranties that a bar code can be easily located with known bar code readers. If a bar code 14 is marked on the narrow edge 15 of a printed wiring board 12, the bar code height is seldom greater than 0.120 inches and in many cases typically 0.060 inches. Since the bar code 14 is extremely small in height, known bar code readers cannot be easily used.

Figure 2:
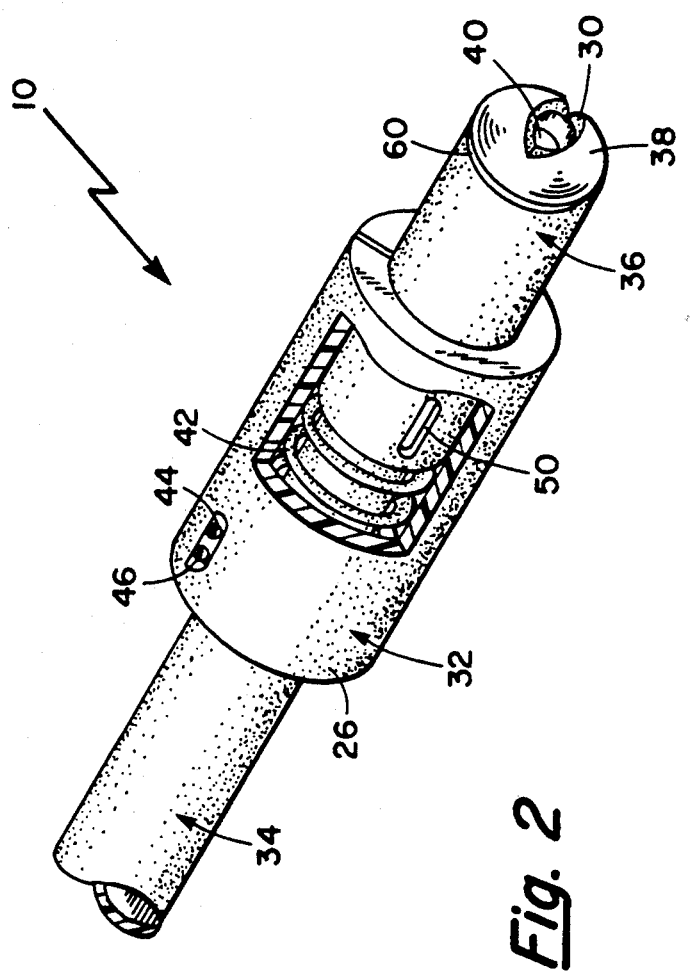
FIG. 2 is an isometric view, partially torn away, of the bar code wand reader according to the invention.
Figure 3:
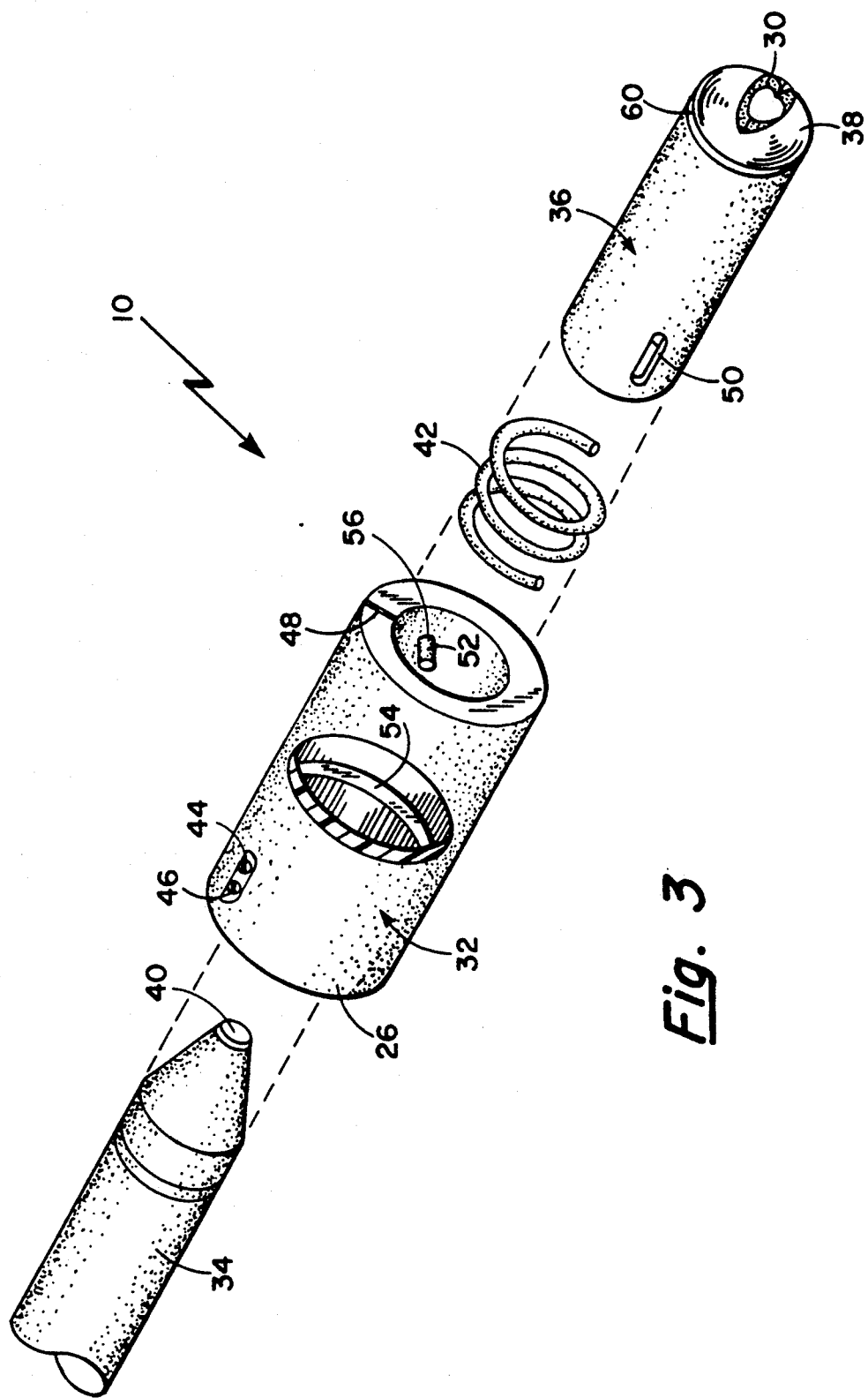
FIG. 3 is an exploded, isometric view, partially torn away, of the bar code wand reader according to the invention.

Referring now to FIGS. 1, 2, and 3, the bar code wand reader 10 is shown to include a wand adapter 32 adapted to fit over a known bar code wand reader 34. The bar code wand reader 34 is here a model LP-1552 wand scanner, manufactured by Symbol Technologies, Inc. of Bohemia, N.Y. or could be any suitable replacement having like characteristics, such as a model 1260

Digital Industrial Wand manufactured by Intermec Corporation of Lynnwood, Washington. The wand adapter 32 can be fabricated from injection molded plastic or alternatively stainless steel with only a fore portion being plastic and shaped as described. The wand adapter 32 includes an aft portion 26 and a fore portion 36 having an end 38 with a "V" groove 30 disposed on the end 38. The "V" groove 30 centers and guides the bar code wand reader 10 along the edge 15 of the printed wiring board 12. The latter compensates for the small surface area and small bar code height. An advantage of the "V" shaped groove is that the bar code wand reader 10 can be used on different boards with varying thickness and the wand adapter 32 will correctly center the bar code 14 on the tip 38 of the bar code wand reader 10. The fore portion 36 of the wand adapter 32 is spring loaded meaning when the tip 38 of the bar code wand reader 10 is pushed against a surface, the tip 40 of the bar code wand reader 34 slides forward so that the tip 40 meets the bar code media. For example, to read a bar code on a surface, a user would present the bar code wand reader 10 up to the bar code and with slight pressure, the tip 40 travels forward until the tip 40 is in contact with the media having the bar code. The spring loaded action in the wand adapter 32 also allows for compensation of different printed wiring board thicknesses. With varying thicknesses, the boards rest at different heights in the "V" groove 30. The spring action assures the tip 40 is in contact with the media independent of the board thickness.

A spring 42 is mounted within the wand adapter 32 as shown such that the spring 42 is partially compressed between the fore portion 36 and a shelf 54 circumferentially disposed on the inner surface of the aft portion 26 to provide the spring action for the fore portion 36 of the bar code wand reader 10. The wand adapter 32 includes a slit 48 along an outer side of the aft portion 26 allowing the inner diameter of the aft portion 26 to enlarge to accommodate the bar code wand reader 34. The wand adapter 32 is secured to the bar code wand reader 34 by a pair of screws 44,46 such that when screwed in place the inner diameter of the aft portion 26 is reduced and the wand adapter 32 is attached to the bar code wand reader 34. A pair of slots, including slot 50, diametrically opposed to each other are provided as shown in the fore portion 36. A pair of holes, including hole 56, diametrically opposed to each other are provided through the wall of the aft portion 26. A first pin 52 is placed through the hoe 56, the first pin 52 capturing the corresponding slot (not shown) in the fore portion 36, when assembled. A second pin (not shown) is placed through the hole (not shown) diametrically opposed to the hole 56, the second pin capturing the slot 50 in the fore portion 36, when assembled. The first and second pins allow the fore portion 36 to move fore and aft, while preventing the fore portion 36 from separating from the aft portion 26.

As described briefly hereinbefore, the fore and aft portions of the wand adapter 32 can be fabricated from injection molded plastic. Alternatively, the aft portion 26 of the wand adapter 32 can be fabricated from stainless steel to provide more durability. The tip 38 of the fore portion 36 is preferably plastic providing a softer surface for the bar code wand reader 10 to move against a surface of an object having a bar code disposed thereon. A thin protective coating 60 can be disposed on the surface of the fore portion 36 which mates with the inner surface of the aft portion 26 to increase durability of the fore portion 36 as the fore portion 36 moves in and out of the aft portion 26. Additionally, the fore portion 36 can be removed and replaced as the tip 38 wears by removing the pins, including pin 52 and removing the fore portion 36 and replacing the fore portion 36 with a new fore portion 36. It should be appreciated that the wand adapter 32 could be fabricated as part of the outer shell of the bar code wand reader 34 during initial assembly, instead of being an after acquired item. It should also be appreciated that the shape of the groove 30 could be adapted to conform to the shape of the media having a bar code disposed thereon, thus allowing the bar code wand reader 10 to slide across a surface of a bottle, a ball or any other curved surface in a controlled manner.

Figure 5:
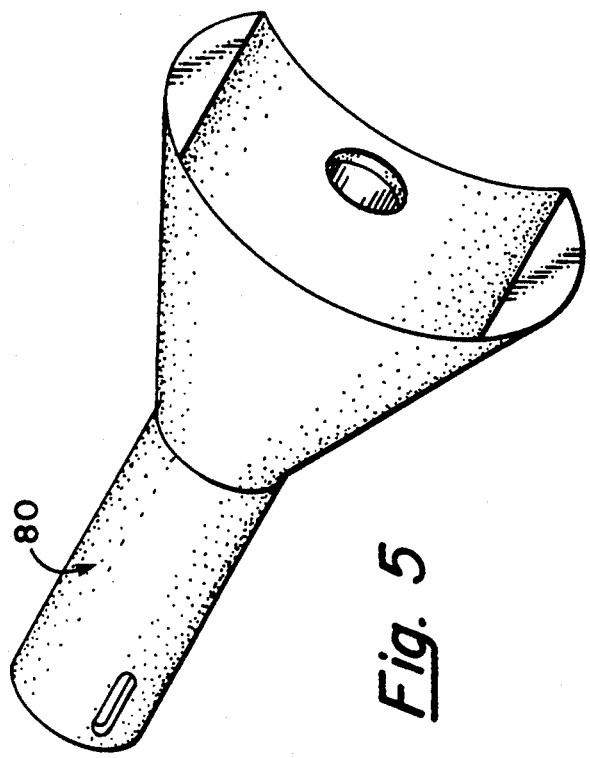
FIG. 5 is an isometric view of a second alternative embodiment of a fore portion of the bar code wand reader.
Figure 4:
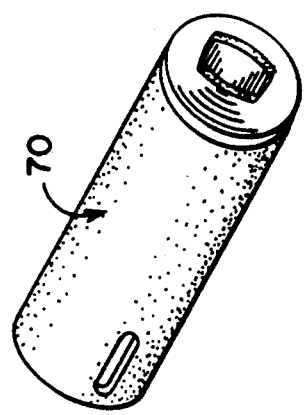
FIG. 4 is an isometric view of a first alternative embodiment of a fore portion of the bar code wand reader.

Referring now to FIG. 4, a fore portion 70 is shown, which would replace the fore portion 36 of FIG. 3. In this embodiment, the fore portion 70 is adapted to guide the bar code wand reader 34 (FIG. 3) across a square surface having here a 7/16 inch diameter and a bar code disposed thereon. Referring now to FIG. 5, a fore portion 80 is shown, which would replace the fore portion 36 of FIG. 3. In this embodiment, the fore portion 80 is adapted to guide the bar code wand reader 34 (FIG. 3) across a second surface such as a pipe having a bar code disposed thereon. It should be appreciated the rate of curvature of the end of the fore portion 80 is configured to approximate the rate of curvature of a surface having a bar code disposed thereon.

It should now be apparent, with such an arrangement, the bar code wand reader 10 is adapted to a read bar code disposed on an irregular surface and with the spring loaded action, also able to read bar code disposed on a flat surface such as a badge or a piece of paper.

Having described this invention, it will now be apparent to one of skill in the art various changes may be made without affecting this invention. For example, the pins used to capture the slots in the fore portion of the wand adapter could be replaced with screws which extend into the corresponding slots. Furthermore, the fore portion of the wand adapter could include a tip having varying shapes in addition to those disclosed to accommodate the respective shape of the object having a bar code disposed thereon. It is felt, therefore, that this invention should not be restricted to its disclosed embodiment, but rather should be limited only by the spirit and scope of the appended claims.

What is claimed is:

1. A bar code wand reader adapter comprising:
   a fore portion having a bore disposed therein, the bore being adapted to have inserted therein a bar code wand reader with an end of said fore portion having a void disposed therein, with the void having a shape adapted to a shape of a media having a bar code disposed thereon;
   an aft portion having a bore to provide an inner surface therein, the fore portion having a section disposed in the bore of the aft portion, the aft portion further comprising a shelf disposed on the inner surface of the aft portion, the adapter further comprising a spring disposed between the shelf and the fore portion of the adapter; and
   wherein the fore portion comprises a slot disposed in the section disposed in the bore of the aft portion and the aft portion, having a hole, further comprises a pin disposed in the hole in the aft portion, the pin engaging the slot disposed in the fore portion.

2. The adapter as recited in claim 1 wherein the shape of the void in the end of the fore portion is a V groove.

3. The adapter as recited in claim 2 further comprising means for attaching the adapter to a bar code wand reader.

4. A bar code wand reader adapter comprising:
  (a) means for controlling a proper disposition of a bar code wand reader from a surface having a bar code disposed thereon, wherein the controlling means comprises:
    (i) an aft portion having a bore to provide an inner surface therein, the aft portion having a shelf disposed on the inner surface of the aft portion;
    (ii) a fore portion having a bore disposed therein, the bore of the fore portion adapted to have inserted therein a bar code wand reader, with an end of said fore portion having a void disposed therein, the void having a shape adapted to capture a portion of the surface having the bar code, the fore portion having a section disposed in the bore of the aft section; and
    (iii) a spring disposed between the shelf and the fore portion;
  (b) means for attaching the controlling means to the bar code wand reader; and
  (c) wherein the fore portion further comprises a slot disposed in the section disposed in the bore of the aft portion and the aft portion, having a hole, further comprises a pin disposed in the hole in the aft portion, the pin engaging the slot disposed in the fore portion.

5. A bar code reader comprising:
  (a) means for reading a bar code disposed on a surface;
  (b) means for controlling a proper disposition of the reading means form the surface having the bar code disposed thereon, the controlling means comprising:
    (i) an aft portion having a bore to provide an inner surface therein, the aft portion having a shelf disposed on the inner surface of the aft portion;
    (ii) a fore portion having a bore disposed therein, the bore of the fore portion having the reading means disposed therein, the fore portion with an end having a void disposed therein, the void having a shape adapted to capture the surface having the bar code, the fore portion having a section disposed in the bore of the aft section; and
    (iii) means, disposed between the shelf and the fore portion, for maintaining tension between the shelf and the fore portion; and
  (c) wherein the fore portion further comprises a slot disposed in the section disposed in the bore of the aft portion and the aft portion, having a hole, further comprises a pin disposed in the hole in the aft portion, the pin engaging the slot disposed in the fore portion.

* * * * *